(12) United States Patent
Manamohan et al.

(10) Patent No.: US 11,966,818 B2
(45) Date of Patent: Apr. 23, 2024

(54) SYSTEM AND METHOD FOR SELF-HEALING IN DECENTRALIZED MODEL BUILDING FOR MACHINE LEARNING USING BLOCKCHAIN

(71) Applicant: Hewlett Packard Enterprise Development LP, Houston, TX (US)

(72) Inventors: Sathyanarayanan Manamohan, Chennai (IN); Krishnaprasad Lingadahalli Shastry, Bangalore (IN); Vishesh Garg, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 774 days.

(21) Appl. No.: 16/282,098

(22) Filed: Feb. 21, 2019

(65) Prior Publication Data
US 2020/0272934 A1     Aug. 27, 2020

(51) Int. Cl.
G06N 20/00     (2019.01)

(52) U.S. Cl.
CPC .................................. *G06N 20/00* (2019.01)

(58) Field of Classification Search
CPC . G06N 20/00; G06F 11/1658; G06F 11/1438; G06F 11/1425
See application file for complete search history.

(56) References Cited

U.S. PATENT DOCUMENTS

| | | | |
|---|---|---|---|
| 6,363,416 B1 | 3/2002 | Naeimi et al. | |
| 9,413,779 B2 | 8/2016 | Vasseur et al. | |
| 9,569,517 B1 | 2/2017 | Smola et al. | |
| 9,633,315 B2 * | 4/2017 | Chapelle | G06N 20/00 |
| 9,779,557 B2 | 10/2017 | Hauser et al. | |

(Continued)

FOREIGN PATENT DOCUMENTS

| | | |
|---|---|---|
| AU | 2017100968 A4 | 9/2017 |
| CN | 105488675 A | 4/2016 |

(Continued)

OTHER PUBLICATIONS

Cheung et al., "Decentralized Machine Learning White Paper", Dec. 31, 2017, Updated Apr. 9, 2018. (Year: 2018).*

(Continued)

*Primary Examiner* — Luis A Sitiriche
(74) *Attorney, Agent, or Firm* — Sheppard Mullin Richter & Hampton LLP

(57) ABSTRACT

Decentralized machine learning to build models is performed at nodes where local training datasets are generated. A blockchain platform may be used to coordinate decentralized machine learning (ML) over a series of iterations. For each iteration, a distributed ledger may be used to coordinate the nodes communicating via a blockchain network. A node can include self-healing features to recover from a fault condition within the blockchain network in manner that does not negatively impact the overall learning ability of the decentralized ML system. During self-healing, the node can determine that a local ML state is not consistent with the global ML state and trigger a corrective action to recover the local ML state. Thereafter, the node can generate a blockchain transaction indicating that it is in-sync with the most recent iteration of training, and informing other nodes to reintegrate the node into ML.

20 Claims, 7 Drawing Sheets

(56) References Cited

U.S. PATENT DOCUMENTS

| | | | |
|---|---|---|---|
| 9,875,510 B1 | 1/2018 | Kasper | |
| 10,057,243 B1 | 8/2018 | Kumar et al. | |
| 10,360,500 B2 | 7/2019 | Kabul et al. | |
| 10,547,679 B1 | 1/2020 | Burnett et al. | |
| 10,671,435 B1* | 6/2020 | Gold | G06F 9/5027 |
| 11,201,747 B2 | 12/2021 | Scherrer et al. | |
| 11,334,817 B2 | 5/2022 | Wang et al. | |
| 2012/0039473 A1 | 2/2012 | Gentry et al. | |
| 2013/0290223 A1 | 10/2013 | Chapelle et al. | |
| 2015/0193697 A1 | 7/2015 | Vasseur et al. | |
| 2015/0324690 A1 | 11/2015 | Chilimbi et al. | |
| 2015/0332283 A1 | 11/2015 | Witchey | |
| 2016/0087854 A1 | 3/2016 | Jayanti et al. | |
| 2016/0179835 A1 | 6/2016 | Mika et al. | |
| 2016/0217388 A1 | 7/2016 | Okanohara et al. | |
| 2016/0261690 A1 | 9/2016 | Ford | |
| 2016/0335533 A1 | 11/2016 | Davis et al. | |
| 2017/0060988 A1 | 3/2017 | Kudo et al. | |
| 2017/0091397 A1 | 3/2017 | Shah | |
| 2017/0103468 A1 | 4/2017 | Orsini et al. | |
| 2017/0116693 A1 | 4/2017 | Rae et al. | |
| 2017/0134158 A1 | 5/2017 | Pasol et al. | |
| 2017/0140145 A1 | 5/2017 | Shah | |
| 2017/0169358 A1 | 6/2017 | Choi et al. | |
| 2017/0220949 A1 | 8/2017 | Feng et al. | |
| 2017/0272342 A1 | 9/2017 | Zessin et al. | |
| 2017/0279774 A1 | 9/2017 | Booz et al. | |
| 2017/0289111 A1 | 10/2017 | Voell et al. | |
| 2017/0302663 A1 | 10/2017 | Nainar et al. | |
| 2018/0018590 A1 | 1/2018 | Szeto et al. | |
| 2018/0039667 A1 | 2/2018 | Pierce et al. | |
| 2018/0157688 A1 | 6/2018 | Zessin et al. | |
| 2018/0183768 A1 | 6/2018 | Lobban et al. | |
| 2018/0217905 A1 | 8/2018 | Reza et al. | |
| 2018/0247191 A1 | 8/2018 | Katz et al. | |
| 2018/0276626 A1 | 9/2018 | Laiben | |
| 2018/0331897 A1 | 11/2018 | Zhang et al. | |
| 2019/0020629 A1 | 1/2019 | Baird et al. | |
| 2019/0042407 A1* | 2/2019 | Gao | G06F 12/0253 |
| 2019/0089716 A1* | 3/2019 | Stöcker | H04L 67/104 |
| 2019/0138929 A1 | 5/2019 | Wong et al. | |
| 2019/0147532 A1 | 5/2019 | Singh et al. | |
| 2019/0182030 A1 | 6/2019 | Jo | |
| 2019/0182231 A1 | 6/2019 | Harrer et al. | |
| 2019/0236598 A1 | 8/2019 | Padmanabhan | |
| 2019/0268284 A1 | 8/2019 | Karame et al. | |
| 2019/0287026 A1* | 9/2019 | Calmon | G06N 20/00 |
| 2019/0295000 A1 | 9/2019 | Candel et al. | |
| 2019/0317934 A1 | 10/2019 | Jentzsch et al. | |
| 2019/0325432 A1 | 10/2019 | Ow et al. | |
| 2019/0332921 A1 | 10/2019 | Rodriguez | |
| 2019/0332955 A1 | 10/2019 | Manamohan et al. | |
| 2019/0332966 A1 | 10/2019 | Gidney | |
| 2019/0347540 A1 | 11/2019 | Yim et al. | |
| 2020/0042362 A1 | 2/2020 | Cui et al. | |
| 2020/0057920 A1 | 2/2020 | Collins et al. | |
| 2020/0193292 A1 | 6/2020 | Weng et al. | |
| 2020/0218940 A1 | 7/2020 | Anglin et al. | |
| 2020/0242511 A1 | 7/2020 | Kale et al. | |
| 2020/0244435 A1 | 7/2020 | Shpurov et al. | |
| 2020/0348662 A1 | 11/2020 | Cella et al. | |
| 2021/0134095 A1 | 5/2021 | Milt et al. | |
| 2022/0261634 A1 | 8/2022 | Liu et al. | |
| 2022/0344060 A1 | 10/2022 | Kristal et al. | |
| 2023/0010095 A1 | 1/2023 | Alabbasi et al. | |
| 2023/0041118 A1 | 2/2023 | Imabayashi et al. | |

FOREIGN PATENT DOCUMENTS

| | | |
|---|---|---|
| CN | 106228446 A | 12/2016 |
| CN | 106445711 A | 2/2017 |
| CN | 106911513 A | 6/2017 |
| CN | 107103087 A | 8/2017 |
| CN | 107332900 A | 11/2017 |
| CN | 107395349 A | 11/2017 |
| CN | 107395353 A | 11/2017 |
| CN | 107579848 | 1/2018 |
| CN | 107665154 A | 2/2018 |
| CN | 108268638 A | 7/2018 |
| CN | 109033757 A | 12/2018 |
| CN | 109685501 A | 4/2019 |
| CN | 109889326 A | 6/2019 |
| CN | 110428056 A | 11/2019 |
| CN | 110472745 A | 11/2019 |
| CN | 110490305 A | 11/2019 |
| CN | 110490330 A | 11/2019 |
| EP | 3564873 A1 | 11/2019 |
| WO | 2017/203093 A1 | 11/2017 |
| WO | 2018/059939 A1 | 4/2018 |
| WO | 2018/130267 A1 | 7/2018 |
| WO | 2018/191030 A1 | 10/2018 |

OTHER PUBLICATIONS

Kate et al., 2012, "Distributed Key Generation in the Wild" Report 2012/377 (Year: 2012).*

M. Shen, X. Tang, L. Zhu, X. Du and M. Guizani, "Privacy-Preserving Support Vector Machine Training Over Blockchain-Based Encrypted IoT Data in Smart Cities," in IEEE Internet of Things Journal, vol. 6, No. 5, pp. 7702-7712, Oct. 2019, doi: 10.1109/JIOT.2019.2901840. (Year: 2019).*

Kate, Aniket et al. "Distributed Key Generation in the Wild." IACR Cryptol. ePrint Arch. 2012 (2012): 377. (Year: 2012).*

Cheung et al. "Distributed Machine Learning White Paper" 2017. (Year: 2017).*

Ben Dickson, "The case for decentralized artificial intelligence", TechTalks, available online at <https://bdtechtalks.com/2018/01/10/decentralized-ai-blockchain/>, Jan. 10, 2018, 5 pages.

Bonawitz et al., "Practical Secure Aggregation for Privacy-Preserving Machine Learning", CCS'17, ACM, Oct. 30-Nov. 3, 2017, pp. 1175-1191.

Catherine Sturman, "OWKIN is set to use machine learning to augment medical and biology research", Healthcare Global, available online at <https://www.healthcareglobal.com/technology/owkin-set-use-machine-learning-augment-medical-and-biology-research>, Jun. 19, 2018, 8 pages.

Chen et al., "ALGORAND", Computer Science Cryptography and Security, May 26, 2017, pp. 1-75.

Extended European Search Report received for EP Patent Application No. 18177565.1, dated Nov. 30, 2018, 08 pages.

Extended European Search Report received for EP Patent Application No. 18177566.9, dated Dec. 13, 2018, 07 pages.

Extended European Search Report received for EP Patent Application No. 18183265.0, dated Feb. 4, 2019, 11 pages.

Fred Ehrsam, "Blockchain-based Machine Learning Marketplaces", Medium, available online at <https://medium.com/@FEhrsam/blockchain-based-machine-learning-marketplaces-cb2d4dae2c17>, Mar. 13, 2018, 10 pages.

Georgopoulos et al., "Distributed machine learning in networks by consensus", Neurocomputing, Elsevier, vol. 124, 2013, 11 pages.

Kurtulmus et al., "Trustless Machine Learning Contracts; Evaluating and Exchanging Machine Learning Models on the Ethereum Blockchain", Research Gate, Feb. 27, 2018, 11 pages.

Lei Shi, "The convergence of AI and IoT, are we there yet?", available online at <https://northstream.se/insights/blog/the-convergence-of-ai-and-iot-are-we-there-yet/>, Oct. 11, 2017, 11 pages.

Li et al., "Scaling Distributed Machine Learning with the Parameter Server", 11th USENIX Symposium on Operating Systems Design and Implementation, Oct. 6-8, 2014, 17 pages.

Mendis et al., "Blockchain as a Service: An Autonomous, Privacy Preserving, Decentralized Architecture for Deep Learning", Research Paper, Jul. 5, 2018, pp. 1-8.

Nakamoto et al., "Bitcoin: A Peer-to-Peer Electronic Cash System", Oct. 31, 2008, pp. 1-9.

Pop at al., "Blockchain Based Decentralized Management of Demand Response Programs in Smart Energy Grids", MDPI, Jan. 9, 2018, pp. 1-21.

(56) References Cited

OTHER PUBLICATIONS

Venkataraman et al., "Adopting blockchain for enterprise asset management (EAM)", IBM, available online at <https://developer.ibm.com/technologies/blockchain/tutorials/cl-adopting-blockchain-for-enterprise-asset-management-eam/>, Mar. 17, 2017, 15 pages.
Weng et al., "DeepChain: Auditable and Privacy-Preserving Deep Learning with Blockchain-based Incentive", Journal of Latex Class Files, vol. 14(8), Nov. 2019, pp. 1-18.
Search Report and Written Opinion received for PCT Application No. PCT/US2021/014932, dated May 13, 2021, 08 pages.
Search Report and Written Opinion received for PCT Application No. PCT/US2021/013394, dated Apr. 19, 2021, 08 pages.
Distributed Ledger Technology in Payment, Clearing and Settlement, (Technical Paper), Feb. 2017, 29 Pgs.
Zhang, C. et al., Stay Fresh: Speculative Synchronization for Fast Distributed Machine Learning, (Research Paper), Retrieved Jan. 13, 2019, 11 Pgs.
Abadi et al., "TensorFlow: A System for Large-Scale Machine Learning", 2th USENIX Symposium on Operating Systems Design and Implementation (OSDI '16), Nov. 2-4, 2016, 21 pages.
Ali et al., "Applications of Blockchains in the Internet of Things: A Comprehensive Survey", IEEE Communications Surveys & Tutorials, 2018, 42 pages.
Kim et al., "On-Device Federated Learning via Blockchain and its Latency Analysis", Research Gate, Aug. 2018, 4 pages.
Sandha et al., "In-database Distributed Machine Learning: Demonstration Using Teradata SQL Engine," Proceedings of the VLDB Endowment, vol. 12, No. 12., Aug. 2019, pp. 1854-1857.
Search Report and Written Opinion received for PCT Application No. PCT/US2020/019064, dated Jun. 2, 2020, 15 pages.
Singla et al.., "Machine Learning for Secure Device Personalization Using Blockchain", IEEE, Sep. 19, 2018, 7 pages.
Verbraeken et al., A Survey on Distributed Machine Learning, (Research Paper), ACM Computing Surveys, vol. 53, No. 2, Mar. 2020, pp. 1-33.
Acar et al., "A Survey on Homomorphic Encryption Schemes: Theory and Implementation", ACM Computing Surveys, vol. 51, No. 4, Article 79, Jul. 2018, pp. 79:1-79:35.
Bonawitz et al., "Practical Secure Aggregation for Privacy-Preserving Machine Learning", Cryptology ePrint Archive: Report 2017/281, 2017, 21 pages.
Kurakin et al., "Adversarial Examples in the Physical World", CoRR, abs/1607.02533, 2017, pp. 1-14.
Nedic et al., "Network Topology and Communication-Computation Tradeoffs in Decentralized Optimization", Jan. 15, 2018, 32 pages.
Shokri et al., "Membership Inference Attacks Against Machine Learning Models", CoRR, abs/1610.05820, 2017, 16 pages.
Yuan et al., "Privacy Preserving Back-Propagation Neural Network Learning Made Practical with Cloud Computing", IEEE Transactions on Parallel and Distributed Systems, 2013, vol. 25, pp. 1-11.
"Decentralized Machine Learning White Paper", available online at <www.decentralizedml.com>, Dec. 31, 2017, 58 pages.
Chen et al., "When Machine Learning Meets Blockchain: A Decentralized, Privacy-preserving and Secure Design", IEEE International Conference on Big Data (Big Data), 2018, pp. 1178-1187.
Diro et al., "Deep Learning: The Frontier for Distributed Attack Detention in Fog-to-Things Computing", IEEE Communications Magazine, Feb. 2018, , pp. 169-175.
Yuguang et al., "Review and Research for Consensus Mechanism of Block Chain", China Academic Journal Electronic Publishing House, Research Papers, vol. 4, No. 4, Apr. 2018, pp. 369-379. (English Abstract Only).
European Search Report and Search Opinion received for EP Application No. 21747157.2, dated Oct. 28, 2022, 5 pages.
Li et al., "DLBC: A Deep Learning-Based Consensus in Blockchains for Deep Learning Services", IEEE Transactions on Services Computing, Jan. 31, 2020, 13 pages.
Lihu et al., "A Proof of Useful Work for Artificial Intelligence on the Blockchain", Jan. 25, 2020, 25 pages.
Teerapittayanon et al., "DaiMON: A Decentralized Artificial Intelligence Model Network", Jul. 2019, 8 pages.
Zhang et al., "Slay Fresh: Speculative Synchronization for Fast Distributed Machine Learning", 2018 IEEE 38th International Conference on Distributed Computing Systems {ICDCS), 2018, 11 pages.
Reisizadeh et al., "Robust and Communication-Efficient Collaborative Learning", Oct. 31, 2019, 33 pages.
Watanabe et al., "Blockchain contract: A complete consensus using blockchain," 2015 IEEE 4th Global Conference on Consumer Electronics (GCCE), 2015, pp. 577-578, doi: 10.1109/GCCE.2015.7398721. (Year: 2015).
Xu et al., "HybridAlpha: An Efficient Approach for Privacy-Preserving Federated Learning", ACM, 2019,11 pages.
Yang et al. "Federated Machine Learning: Concept and Applications." arXiv preprint arXiv: 1902.04885 (2019). (Year: 2019).
Resizadeh, et al., "Quantized Decentralized Consensus Optimization"; 2018 IEEE Conference on Decision and Control (CDC) (Year: 2018).
Zhu, et al., Blockchain-Based Privacy Preserving Deep Learning. In: Guo, F., Huang, X., Yung, M. (eds) Information Security and Cryptology. Inscrypt 2018. Lecture Notes in Computer Science(), vol. 1144 (Year: 2018).
Castro et al, "Practical Byzantine Fault Tolerance", Proceedings of the Third Symposium on Operating Systems Design and Implementation, New Orleans, USA, Feb. 1999 (Year: 1999).
Chen et al, "On Security Analysis of Proof-of-Elapsed-Time (PoET)", In: Spirakis, P., Tsigas, P. (eds) Stabilization, Safety, and Security of Distributed Systems. SSS 2017. Lecture Notes in Computer Science(), vol. 10616. Springer, Cham, https://doi.org/10.1007/978-3-319-69084-1_19 (Year: 2017).
Feng et al, "Scalable Dynamic Multi-Agent Practical Byzantine Fault-Tolerant Consensus in Permissioned Blockchain". Appl. Sci. 2018, 8, 1919. https://doi.org/10.3390/app8101919 (Year: 2018).
Nguyen et al, "A Survey about Consensus Algorithms Used in Blockchain", J Inf Process Syst, vol. 14, No. 1, pp. 101-128, Feb. 2018 https://doi.org/10.3745/JIPS.01.0024 (Year: 2018).

* cited by examiner

SYSTEM AND METHOD FOR SELF-HEALING IN DECENTRALIZED MODEL BUILDING FOR MACHINE LEARNING USING BLOCKCHAIN

DESCRIPTION OF RELATED ART

Efficient model building requires large volumes of data. While distributed computing has been developed to coordinate large computing tasks using a plurality of computers, applications to large scale machine learning ("ML") problems is difficult. There are several practical problems that arise in distributed model building such as coordination and deployment difficulties, security concerns, effects of system latency, fault tolerance, parameter size and others. While these and other problems may be handled within a single data center environment in which computers can be tightly controlled, moving model building outside of the data center into truly decentralized environments creates these and additional challenges. For example, a system for decentralized ML may be within a limitedly-distributed computing environment, having a finite number of computing nodes. Thus, a relatively smaller number of nodes can participate in ML-based processes in these computing environments, in comparison to open approaches that may theoretically use an unlimited number of nodes (e.g., federated ML). The contribution of each node in decentralized ML may be more valuable in such computing environments with a limited population of participating nodes. Thus, it may be desirable to further adapt decentralized model building to achieve fault tolerance. Fault tolerance may prevent the complete loss of a node (or group of nodes) throughout the decentralized model building process and mitigate the impact of a failed node (or group of nodes) on the overall learning ability of the ML system.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
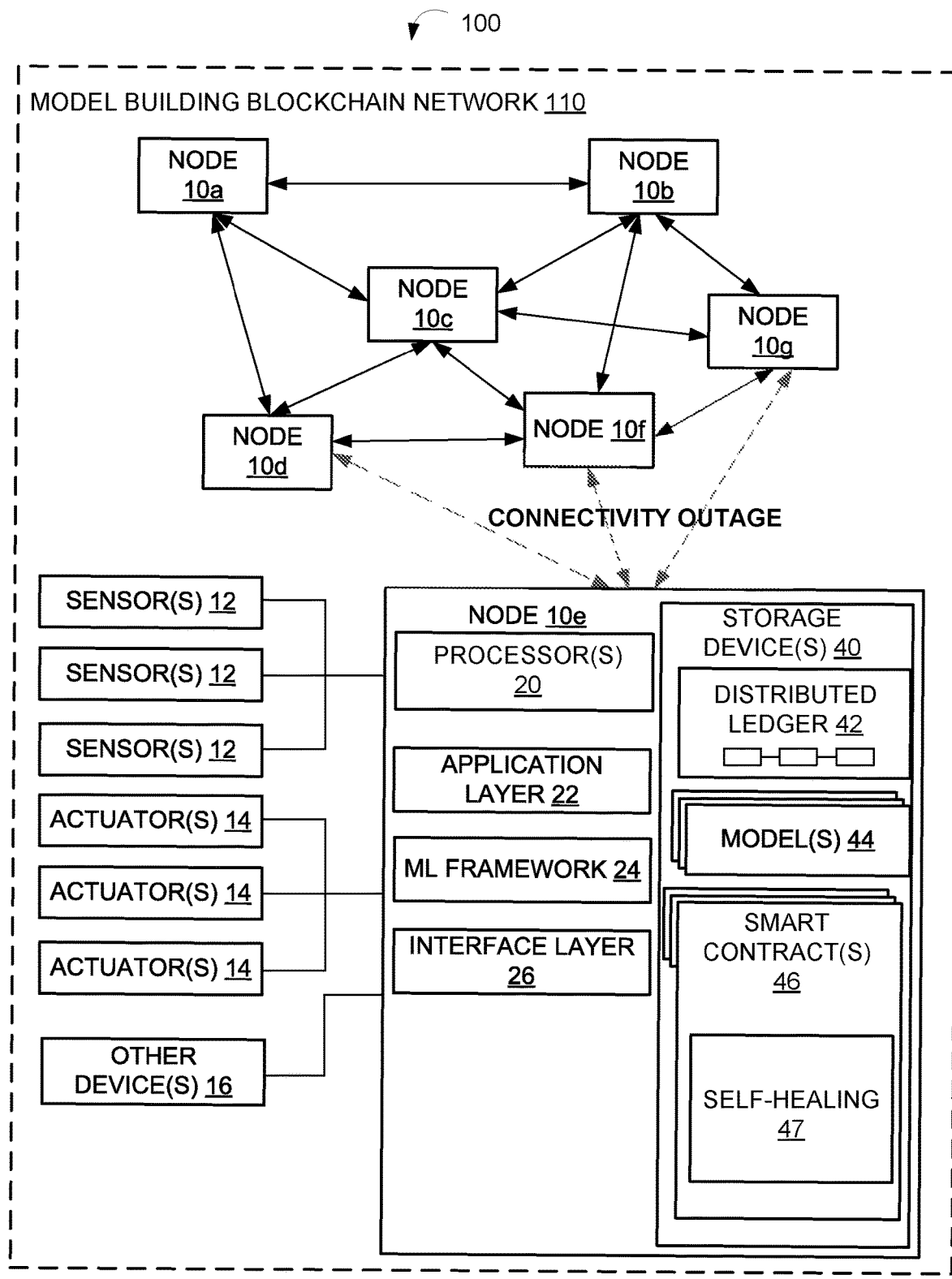
FIG. 1 depicts an example of a system of decentralized model building for machine learning (ML) using blockchain including self-healing of a participant node, according to some embodiments.

The figures are not exhaustive and do not limit the present disclosure to the precise form disclosed.

DETAILED DESCRIPTION

Various embodiments described herein are directed to a method and a system for self-healing of a computer node in decentralized model building for machine learning (ML) using blockchain. In some distributed computing environments, such as enterprise systems (e.g., a computer networking system operating in a domain controlled by a particular organization or enterprise), there may be a finite number of computing resources that are present, or otherwise available for use. A distributed computing environment may be limited to a relatively small number of computers due to a number of varying factors, such as data privacy concerns, organizational structure, restricted network access, computer inventory, and the like. For example, only a subset of computers within an enterprise network may be authorized to access the information needed for a training dataset in ML. Accordingly, data privacy restrictions associated with the enterprise environment can further restrict the number of computers in the enterprise network that can qualify as participants in ML. In general, limitedly-distributed computing environments typically have fewer computing nodes that can be contributors in decentralized model building, as disclosed herein. In order for some current ML techniques to operate with the expected precision using computers of a limitedly-distributed computing environment, there is an implied requirement that substantially all of the participating nodes are available and contributing their respective learning during model building for ML. Additionally, in order to maintain a desirable accuracy for ML within limitedly-distributed computing environment, these existing ML approaches may further require that any failed node be recovered almost immediately (e.g., short node down-time). Continuing ML while a participating node has failed has the potential to corrupt the data (e.g., partial learning, missing data from training datasets) used throughout the system, as ML as heavily collaboration process. Thus, a single down node can negatively affect the learning at other nodes, which can ultimately cause degradation of the respective local models and reduce the overall effectiveness of the system. In some cases, a model can increasingly degrade in a manner that is proportional to the downtime of the participating node. For example, the longer a node is absent from a model building process having a finite number of participants, the potentially more determinantal the effect on ML. In a best-case scenario, maintaining the proper function of every computer in the system can avoid these problems and ensure precise ML. Nonetheless, it may be inevitable for at least one computer that is participating in model building to experience unintended failures in real-world scenarios.

As alluded to above, implementing fault tolerance at the node-level in decentralized model building for ML can address some of the potential drawbacks associated with limitedly-distributed computing environments. For instance, in the event a node loses communication with the network, achieving fault tolerance at each node can maintain an expected accuracy of ML models even within limitedly-distributed computing environments. According to the embodiments, a participating node, which may be restarting after undergoing an intermittent failure, can use the disclosed self-healing techniques to automatically correct and reintegrate into the decentralized machine learning process. Thus, the disclosed self-healing aspects provide a decentralized model building process that can tolerate node faults.

Furthermore, some existing ML approaches are used in environments that are not confined to limitedly-distributed computers. For instance, many federated systems used for ML have a setting where the centralized model is trained with training data distributed over a large number of computing devices, and typically over a public or unrestricted communication network. For example, federated ML can be applied to mobile or internet of things (IoT) scenarios in which models are trained from information processed across hundreds of thousands (and in some cases millions) of devices having network connectivity capabilities. Due to the large pool of ML participants and the open accessibility of data, the loss of a few nodes in a federated ML application can have a less significant impact to the overall learning ability of the system, as compared to limitedly-distributed computing environments. As such, many of these existing ML approaches do not implement fault tolerance at the node-level. Although high accessibility may be advantageous for the general concept of ML, there may be instances, such as maintaining the privacy of data, where federated ML approaches may not be desirable. In these cases, self-healing can be Referring to FIG. 1, an example of a system 100 of decentralized model building for machine learning (ML) using blockchain is shown. According to the embodiments, the system 100 performs decentralized parallel ML at nodes 10a-10g over multiple iterations in a blockchain network 110. System 100 may include a model building blockchain network 110 (also referred to as a blockchain network 110) that includes a plurality of computing nodes, or computer devices. Generally, a blockchain network 110 can be a network where nodes 10a-10g use a consensus mechanism to update a blockchain that is distributed across multiple parties. The particular number, configuration and connections between nodes 10a-10g may vary. As such, the arrangement of nodes 10e shown in FIG. 1 is for illustrative purposes only. A node, such as node 10e may be a fixed or mobile device. Examples of further details of a node 10e will now be described. While only one of the nodes 10e is illustrated in detail in the figures, each of the nodes 10a-10g may be configured in the manner illustrated.

FIG. 1 also depicts that node 10e is configured to implement self-healing techniques, as disclosed herein. Through the use of blockchain in ML, the embodiments can leverage an auto-synchronization functionality and state-aware properties associated with a distributed ledger to achieve self-healing. In some cases, each of the nodes 10a-10g in system 100 may be similarly configured for performing self-healing. Furthermore, by including the self-healing feature at the nodes 10a-10g, the system 100 can continue model building even in the presence of intermittent faults. As an example, FIG. 1 illustrates that node 10e can experience a connectivity outage, where previously established connections from node 10e to other nodes 10a-10d, 10f, and 10g in the network 110 (shown by dashed lines) may fail temporarily. For instance, a wireless antenna of node 10e can malfunction, causing its peer-to-peer wireless links between nodes 10d, 10f, and 10g to be lost. As a result, a node 10e may be communicatively disconnected from the other nodes 10a-10d, 10f, and 10g in system 100. In some cases, a connectivity outage can cause node 10e to be disconnected from the entire blockchain network 110. It should be appreciated that a connectivity outage is described as a fault scenario for purposes of illustration, and other forms or node related faults, or failures, can also cause node 10e to initiate the self-healing techniques, as disclosed. Examples of fault scenarios that may require self-healing of node 10e to return to nominal ML operations can include but are not limited to: power outages; software failures; computer system crash; computer system reboot; and the like. For purposes of discussion, a node that is experiencing any of the above-mentioned fault scenarios or is otherwise unable to participate in the ML process, in whole or in part, may be referred to hereinafter as a "down" node or "self-healing" node. For instance, node 10e in FIG. 1 is illustrated as a self-healing node.

There can be a number of challenges associated with realizing self-healing in some existing ML systems that do not utilize blockchain technology, in the manner of the embodiments. For example, connections between nodes 10a-10g in system 100 may be implemented entirely using peer-to-peer networking. In most cases, peer-to-peer connections are established temporarily. Therefore, it may be difficult for the other nodes 10a-10d, 10f, and 10g in the blockchain network 110 to be able to detect that a node 10e has become unavailable due to experiencing a fault (as opposed to an intended disconnection of a peer-to-peer link), such as a connectivity outage, in a robust manner. Similarly, the node 10e may not be equipped to detect for itself, that it has encountered a fault. For instance, in the case when node 10e has restarted after a connectivity outage, the node 10e may not have the capabilities to determine that the connectivity outage previously occurred. Nonetheless, blockchain includes a structure, namely the distributed ledger 42, that is capable of maintaining the state of each of the nodes 10a-10g in the system 100. Thus, state-awareness that is provided by the blockchain can be used during self-healing, so as to allow a down node (e.g., experiencing a fault) to be detectable by the other nodes in the system 100. Even further, blockchain is leveraged such that node 10e has the capability to be self-aware of an encountered fault condition.

Additionally, as previously described, a fault at a single node can potentially impact the entire model building process. Thus, various corrective actions may need to be performed to address these concerns prior to allowing a self-healed node to re-participate in the model building process. Blockchain technology includes synchronization mechanisms that can be applied in order to re-synchronize a restarted node 10e with the system 100, further enhancing self-healing aspects of the embodiments. Accordingly, a synchronization protocol can be executed as a portion of the disclosed self-healing techniques. In general, synchronization ensures that a self-healed node is properly reintegrated into the decentralized model building process of in a manner that maintains the overall effectiveness of ML, as described in greater detail in reference to FIGS. 2A-2B.

According to the embodiments, node 10e includes a self-healing module 47. The self-healing module 47 can program node 10e to execute various functions that allow the node 10e to automatically correct and reintegrate into the decentralized model building of system 100, in accordance with the self-healing techniques described herein. Furthermore, according to various implementations, the node 10e and components described herein may be implemented in hardware and/or software that configure hardware. The self-healing module 47 is shown as modular portion of the rules realized by smart contracts 46. In particular, rules encoded by the self-healing module 47 can enable decentralized model building to function in a fault tolerant manner, as previously described.

Node 10e may include one or more sensors 12, one or more actuators 14, other devices 16, one or more processors 20 (also interchangeably referred to herein as processors 20, processor(s) 20, or processor 20 for convenience), one or more storage devices 40, and/or other components. The sensors 12, actuators 14, and/or other devices 16 may generate data that is accessible locally to the node 10e. Such data may not be accessible to other participant nodes 10a-10d, 10f, and 10g in the model building blockchain network 110.

FIG. 1 shows that the storage device(s) 40 may store: distributed ledger 42; model(s) 44; and smart contract(s) 46 including the self-healing model 47, The distributed ledger 42 may include a series of blocks of data that reference at least another block, such as a previous block. In this manner, the blocks of data may be chained together. The distributed ledger 42 may store blocks that indicate a state of a node 10e relating to its machine learning during an iteration. Thus, the distributed ledger 42 may store an immutable record of the state transitions of a node 10e. In this manner, the distributed ledger 42 may store a current and historic state of a model 44. It should be noted, however, that in some embodiments, some collection of records, models, and smart contracts from one or more of other nodes may be stored in distributed ledger 42.

The distributed ledger 42, transaction queue, models 44, smart contracts 46, and/or other information described herein may be stored in various storage devices such as storage device 40. Other storage may be used as well, depending on the particular storage and retrieval requirements. For example, the various information described herein may be stored using one or more databases. Other databases, such as Informix™, DB2 (Database 2) or other data storage, including file-based, or query formats, platforms, or resources such as OLAP (On Line Analytical Processing), SQL (Structured Query Language), a SAN (storage area network), or others may also be used, incorporated, or accessed. The database may comprise one or more such databases that reside in one or more physical devices and in one or more physical locations. The database may store a plurality of types of data and/or files and associated data or file descriptions, administrative information, or any other data.

The node 10e can store a training dataset locally in storage device(s) 40. Model 44 may be locally trained at a node 10e based on locally accessible data such as the training dataset, as described herein. The model 44 can then be updated based on model parameters learned at other participant nodes 10a-10d, 10f, and 10g that are shared via the blockchain network 110. The nature of the model 44 can be based on the particular implementation of the node 10e itself. For instance, model 44 may include trained parameters relating: to self-driving vehicle features such as sensor information as it relates object detection, dryer appliance relating to drying times and controls, network configuration features for network configurations, security features relating to network security such as intrusion detection, and/or other context-based models.

The smart contracts 46 may include rules that configure nodes 10e to behave in certain ways in relation to decentralized machine learning. For example, the rules may specify deterministic state transitions, when and how to elect a master node, when to initiate an iteration of machine learning, whether to permit a node to enroll in an iteration, a number of nodes required to agree to a consensus decision, a percentage of voting nodes required to agree to a consensus decision, and/or other actions that a node 10e may take for decentralized machine learning.

Processors 20 may be programmed by one or more computer program instructions. For example, processors 20 may be programmed to execute an application layer 22, a machine learning framework 24 (illustrated and also referred to as ML framework 24), an interface layer 26, and/or other instructions to perform various operations, each of which are described in greater detail herein. The processors 20 may obtain other data accessible locally to node 10e but not necessarily accessible to other participant nodes 10a-10d, 10f, and 10g as well. Such locally accessible data may include, for example, private data that should not be shared with other devices. As disclosed herein, model parameters that are learned from the private data can be shared according to parameter sharing aspects of the embodiments.

The application layer 22 may execute applications on the node 10e. For instance, the application layer 22 may include a blockchain agent (not illustrated) that programs the node 10e to participate and/or serve as a master node in decentralized machine learning across the blockchain network 110 as described herein. Each node 10a-10g may be programmed with the same blockchain agent, thereby ensuring that each node acts according to the same set of decentralized model building rules, such as those encoded using smart contracts 46. For example, the blockchain agent may program each node 10 to act as a participant node as well as a master node (if elected to serve that roll). The application layer 22 may execute machine learning through the ML framework 24.

The ML framework 24 may train a model based on data accessible locally at a node 10e. For example, the ML framework 24 may generate model parameters from data from the sensors 12, the actuators 14, and/or other devices or data sources to which the node 10e has access. In an implementation, the ML framework 24 may use the machine learning framework, although other frameworks may be used as well. In some of these implementations, a third-party framework Application Programming Interface ("API") may be used to access certain model building functions provided by the machine learning framework. For example, a node 10e may execute API calls to a machine learning framework (e.g., TensorFlow™).

The application layer 22 may use the interface layer 26 to interact with and participate in the blockchain network 110 for decentralized machine learning across multiple participant nodes 10a-10g. The interface layer 26 may communicate with other nodes using blockchain by, for example, broadcasting blockchain transactions and, for a master node elected as describe herein elsewhere, writing blocks to the distributed ledger 42 based on those transactions as well as based on the activities of the master node.

Model building for ML may be pushed to the multiple nodes 10a-10g in a decentralized manner, addressing changes to input data patterns, scaling the system, and coordinating the model building activities across the nodes 10a-10g. Moving the model building closer to where the data is generated or otherwise is accessible, namely at the nodes 10a-10g, can achieve efficient real time analysis of data at the location where the data is generated, instead of having to consolidate the data at datacenters and the associated problems of doing so. Without the need to consolidate all input data into one physical location (data center or "core" of the IT infrastructure), the disclosed systems, methods, and non-transitory machine-readable storage media may reduce the time (e.g., model training time) for the model to adapt to changes in environmental conditions and make more accurate predictions. Thus, applications of the system may become truly autonomous and decentralized, whether in an autonomous vehicle context and implementation or other IoT or network-connected contexts.

According to various embodiments, decentralized ML can be accomplished via a plurality of iterations of training that is coordinated between a number of computer nodes 10a-10g. In accordance with the embodiments, ML is facilitated using a distributed ledger of a blockchain network 110. Each of the nodes 10a-10g can enroll with the blockchain network 110 to participate in a first iteration of training a machine-learned model at a first time. Each node 10a-10g may participate in a consensus decision to enroll another one of the computing nodes to participate in the first iteration. The consensus decision can apply only to the first iteration and may not register the second physical computing node to participate in subsequent iterations.

In some cases, a specified number of nodes 10a-10g are required to be registered for an iteration of training. Thereafter, each node 10a-10g may obtain a local training dataset that is accessible locally but not accessible at other computing nodes in the blockchain network. The node 10e may train a first local model 44 based on the local training dataset during the first iteration and obtain at least a first training parameter based on the first local model. Similarly, each of the other nodes 10a-10d, 10g, and 10f on the blockchain network 100 can train a local model, respectively. In this manner, node 10e may train on data that is locally accessible but not sharable with other nodes 10a-10d, 10f, and 10g. Node 10e can generate a blockchain transaction comprising an indication that it is ready to share the training parameters and may transmit or otherwise provide the training parameters to a master node. The node 10e may do so by generating a blockchain transaction that includes the indication and information indicating where the training parameters may be obtained (such as a Uniform Resource Indicator address). When some or all of the participant nodes are ready to share its respective training parameters, a master node (also referred to as "master computing node") may write the indications to a distributed ledger. The minimum number of participants nodes that are ready to share training parameters in order for the master node to write the indications may be defined by one or more rules, which may be encoded in a smart contract, as described herein.

Node 10e, which is illustrated as experiencing a connectivity outage in FIG. 1, may be temporarily incapable of communicating via the blockchain network 110. Furthermore, node 10e may not be able to transmit a blockchain transaction to update its state during the connectivity outage. In this instance, the master node can determine that it failed to receive a blockchain transaction particularly from node 10e. In accordance with the disclosed self-healing techniques, detecting a missing blockchain transaction can signal to the master node that node 10e is down. Thus, the blockchain allows at least a master node to be aware that node 10e may be experiencing a fault that is preventing the node 10e from communication via the blockchain network 110. In some cases, self-healing of the node 10e can be triggered by detecting a fault condition in this manner. Furthermore, the down node 10e, being unable to connect to its peers or the blockchain network 110, may be unable to share its local training parameters to the other nodes 10a-10d, 10f, and 10g. During the connectivity outage, the node 10e also may not receive updated training parameters from the blockchain. Consequently, even after node 10e has regained connectivity, data local to node 10e may be outdated. As an example, parameters from the most recent iteration may not have been successfully received by node 10e during the connectivity outage. To prevent stale data from being injected in the model building process, self-healing module 47 can cause node 10e to automatically execute a synchronization with the system 100 that reconciles for this loss of data before it continues participation in the decentralized model building process. Self-healing, as disclosed herein, allows the node 10e to automatically perform the actions necessary to be reintroduced into the ML. The automated self-healing is executed by the node 10e such that it eliminates a need for a human operator, such as a network administrator, to manually perform a process for placing the node 10e back into the system 100 after a fault.

Figure 2A:
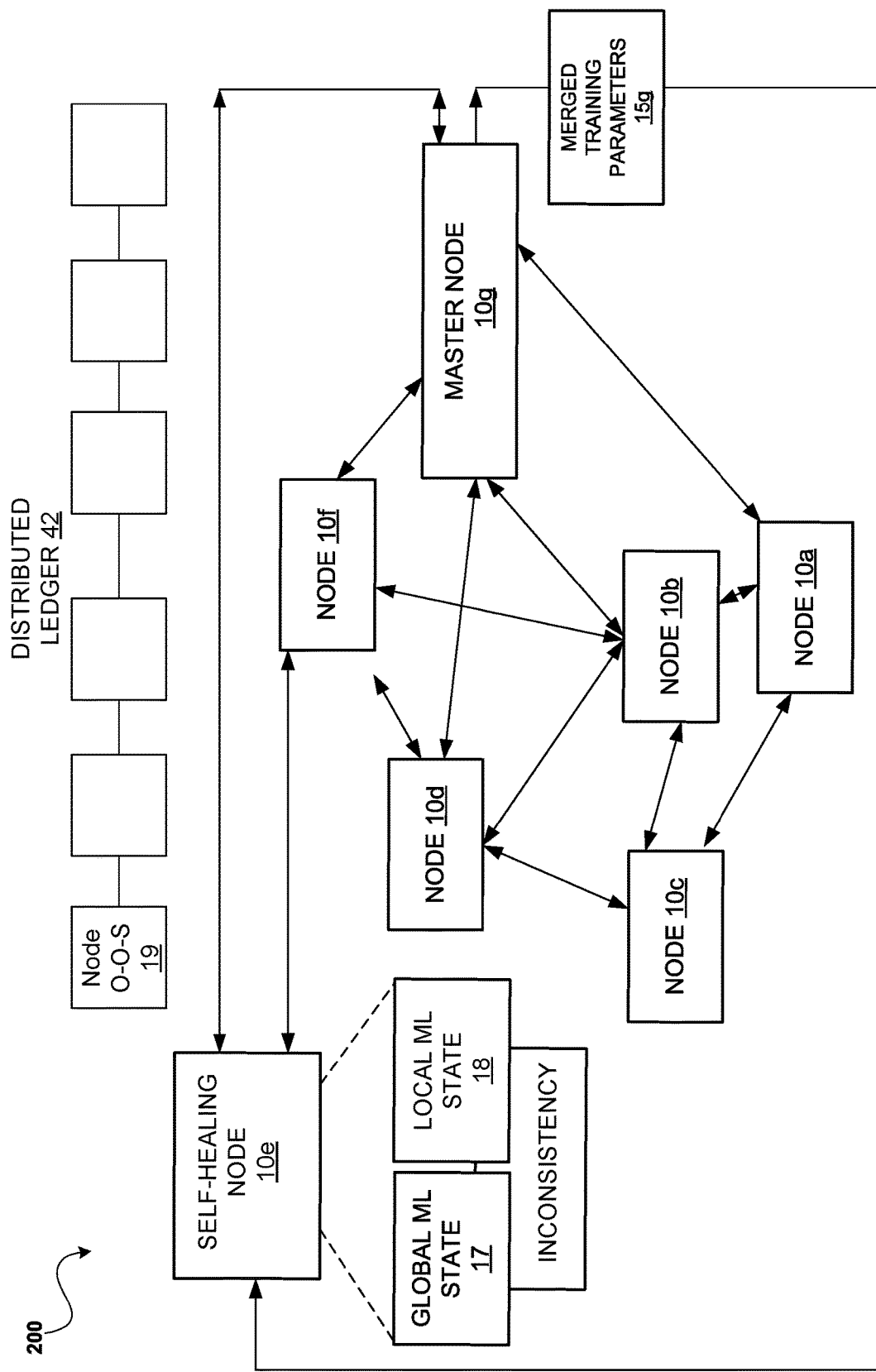
FIGS. 2A-2B illustrate an example of a node in the system of decentralized model building shown in FIG. 1 communicating in accordance with self-healing techniques, according to some embodiments.
Figure 2B:
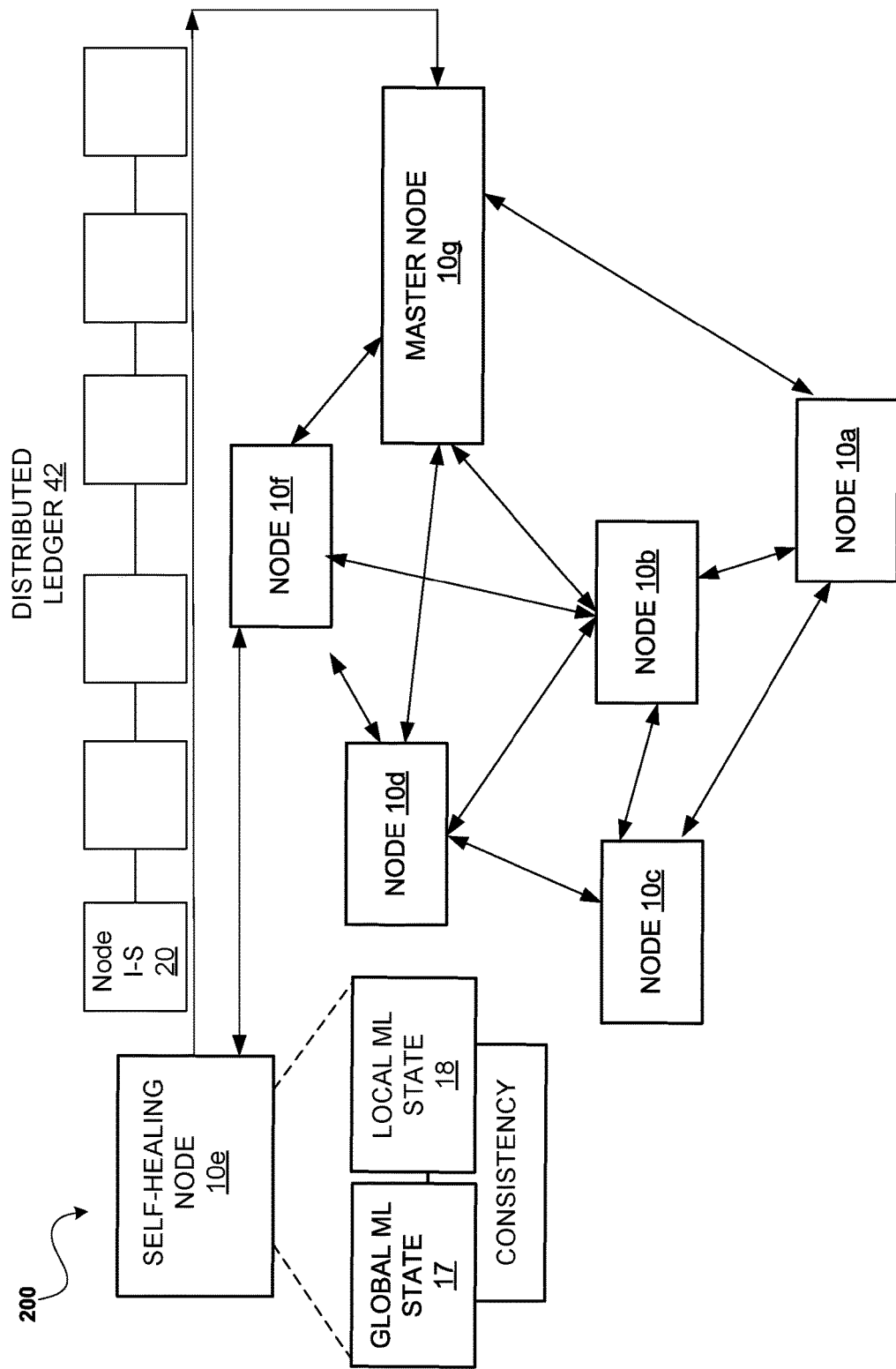

FIGS. 2A-2B illustrate an example of nodes 10a-10g of blockchain network 200 communicating in accordance with the self-healing techniques described above. FIGS. 2A-2B illustrate a self-healing node 10e communicating in a manner that provides fault tolerance during model building (also referred to herein as machine learning or model training). For purposes of illustration, the process is shown as a first phase (primarily shown in FIG. 2A) prior to synchronizing the self-healing node 10e with the system, and a second phase (primarily shown in FIG. 2B) after the self-healing node 10e has been synchronized. FIGS. 2A-2B also depicts a distributed ledger 42 that is global to the blockchain network 200. Additionally, FIGS. 2A-2B show a master node 10g. Each of the other nodes enrolled to participate in an iteration, namely nodes 10a-10d, and 10f, are referred to herein as a "participant node." In some cases, there is a minimum number of participants nodes that must be ready to share training parameters in order for the master node 10g to write the indications may be defined by one or more rules, which may be encoded in a smart contract, as described herein.

As previously described, the distributed ledger 42 can contain information indicating the state of each of the nodes 10a-10g. Accordingly, the distributed ledger 42 can be used to enable state-awareness capabilities for the nodes 10a-10g on the blockchain network 200. In reference to FIG. 2A, the first phase can include the participant nodes 10a-10d, and 10f training their respective local models using local training datasets. For example, each of the participating nodes 10a-10d, and 10f can query a local copy of the distributed ledger 42 to obtain information regarding the current state of the other nodes in the blockchain network. The participating nodes 10a-10d, and 10f can actively contribute during an iteration of model building. The iteration can involve the participating nodes 10a-10d, and 10f having a training data set may be accessible locally to the participant node but not to other nodes. As such, each participant node 10a-10d, and 10f can generate model parameters resulting from the local training dataset, referred to herein as shared parameters. As a result, the participant nodes 10a-10d, and 10f may each share their respective model parameters, as shared parameters, with other participants in the blockchain network 200. For example, each participant node 10a-10d, and 10f may communicate its shared parameter to a master node 10g, which is elected from among the nodes in the blockchain network 200. Furthermore, each of the participant node 10a-10d, and 10f can update its current ML state in the distributed ledger 42.

As seen in FIG. 2A, the master node 10g can be included in the blockchain network 200. The master node 10g may generate a new transaction to be added as a ledger block to each copy of the distributed ledger based on the indication that one of the participating nodes 10a-10d, and 10f is ready to share its shared training parameter, for example. The master node 10g may be elected from among the other nodes 10a-10e by consensus decision or may simply be selected based on being the first node to enroll in the iteration. FIG. 2A illustrates nodes 10a-10d, and 10f as the participant nodes in the blockchain network 200. According to the embodiments, participant nodes 10a-10d, and 10f can train a local model using training data that is accessible locally at the node, but may not be accessible at another node. However, training parameters learned from such data through machine learning can be shared, as the training parameters typically do not expose raw data (which may be comprised of sensitive information). When the training parameters are determined by a node, the node may broadcast an indication that it is ready to share the training parameters. For example, participant node 10a, after training its local model using training data, can broadcast an indication via the blockchain network 200, which is received at least by the master node 10g. Subsequently, participant node 10a can communicate its shared training data via the blockchain network 200, which is received by the master node 10g. As a general description, a master node 10g may obtain shared training parameters from each of the participant nodes 10a-10f in the blockchain network 200, which is referred to herein as "parameter sharing."

During the abovementioned iteration, the self-healing node 10e can be in the process of restarting itself, after a fault condition. In the example of a connectivity outage (as shown in FIG. 1), the self-healing node 10e may not be capable of communicating via the blockchain network 200. In some cases, the self-healing node 10e may have been previously completely down. For example, the self-healing node 10e may have crashed, causing it to lose all of the dynamic content that has not yet been communicated to the blockchain. Continuing with this example, a complete restart of node 10e may be required in this scenario before the node 10e can begin the synchronization portion of the process. In other cases, the self-healing node 10e may be recovering from a network partition, as opposed to a failure. A network partition can be generally characterized as a node being partially down. As an example, when the self-healing node 10e network partitioned, it is properly functioning, but cannot communicate to peer nodes in a manner that allows it participation in the collaborative ML process. In these instances, a complete restart of the self-healing node 10e may not be necessary. The self-healing node 10e can begin synchronizing after network connectivity is reestablished. In some embodiments, the self-healing node 10e is configured to automatically perform any necessary functions needed to recover from the outages described above, such as an automatic restart. Once the node has recovered from the outage, the blockchain layer of the node 10e can initiate the synchronization protocol as an aspect of its self-healing. As an initial step of synchronization, the self-healing node 10e can obtain blocks from the distributed ledger 42. This allows the self-healing node 10e to retrieve any blocks that may have been missed, or lost, during the outage.

The self-healing node 10e can update a local copy of the distributed ledger, thereby obtaining a global ML state 17 and a local ML state 18. The distributed ledger 42, as previously described, can maintain a current (e.g., based on the most recent iteration) global ML state 17 based on the collaborative learning from the nodes of the system, and a current local ML state 18 that is respective to the individual learning that is performed locally each of the nodes. Regarding the self-healing node 10e, its local ML state 18 maintained by the distributed ledger 42 should include data from the most recent iteration in which the node 10e was a participant. Accordingly, the local ML state 18 reflects the state of the self-healing node 10e that was synchronized by the blockchain prior to the fault. Restated, all of the other participant nodes 10a-10d, and 10f are aware that the self-healing node 10e is at the state indicated by its local ML state 18 in the distributed ledger 42. Any other local ML state for node 10e, which is inconsistent with the local ML state 18 maintained by the distributed ledger 42, may be a result of corrupt or outdated data. Thus, the synchronization effectively overrides this data with the local ML state 18 obtained from the distributed ledger, in order to ensure that the state has been verified and is consistent throughout the blockchain.

Furthermore, FIG. 2A illustrates that self-healing node 10e can generate a blockchain transaction 19 indicating that it out-of-sync ("O-O-S"). By transmitting this "O-O-S" blockchain transaction 19, the self-healing nodes signals to the network 200 that although it may be recovered from the fault condition, it has yet to complete the synchronization protocol for self-healing, and its potentially out-of-synch with the blockchain. An out-of-sync node can have machine learning data, including a local model, that has not been updated by the most recent iteration of learning. As alluded to above, the self-healing techniques can prevent the self-healing node 10e from injecting corrupt or stale data into the decentralized model building process by waiting until after the synchronization protocol to allow the node to contribute to ML. In particular, self-healing node 10e writing the O-O-S blockchain transaction 19 to the distributed ledger 42 signals to the other participant nodes 10a-10d, and 10f and the master node 10g that it is not ready to share its learning (e.g., local training parameters) with the system. Accordingly, self-healing node 10e is still being gradually reintroduced into the system and is not included in the present iteration of model building.

Thereafter, as seen in FIG. 2A, the self-healing node 10e can perform comparison between the global ML state 17 and the local ML state 18. The comparison allows the self-healing node 10e to determine whether the local data from its previous learning is synchronized, or up-to-date with the rest of the system. The self-healing node 10e can verifying there is consistency between the state of its local model, for example, and the state of the most recent iteration of model building that has been collaboratively performed by nodes of the blockchain network 200. In particular, FIG. 2A illustrates the case where the self-healing node 10e determines that there is an inconsistency between the global ML state 17 and the local ML state 18. An inconsistency between the global ML state 17 and the local ML state 18 can signify that the local ML state is stale, and requires corrective actions in order to be synchronized with the other nodes of the blockchain network 110. According to the disclosed self-healing techniques, once the self-healing nodes 10e has identified an inconsistency between the global ML state 17, and the local ML state 17, it can automatically perform various corrective actions to recover the state of the node 10e to achieve consistency.

FIG. 2A shows that, as a corrective action, the self-healing node 10e can obtain merged training parameters 15g that have been generated from the most recent iteration of model building. The merger training parameters 15g can be used in accordance with parameter sharing techniques of the decentralized model building system. For example, as alluded to above, the participant nodes 10a-10d, and 10f can share training parameters corresponding to their respective local models. Subsequently, the master node 10g can combine the shared parameters from the participant nodes 10a-10d, and 10f, in order to generate merged training parameters 15g for the most recent iteration. Upon generation of the merged training parameters 15g, the master node 10g may broadcast an indication to the blockchain network 200 that the merged training parameters are available.

The master node 10g may broadcast the indication that it has completed generating the merged training parameters 15g, by writing a blockchain transaction that indicates the state change. Such state change (in the form of a transaction) may be recorded as a block to the distributed ledger 42 with such indication. During the iteration, the participating nodes 10a-10fd, and 10f may periodically monitor the distributed ledger 42 to determine whether the master node 10g has completed the merge, and if so, obtain the merged training parameters 15g. Similarly, during synchronization, the self-healing node 10e can automatically query the distributed ledger 42, as a result of finding inconsistency of its local ML state 18 with the blockchain network during. The merged training parameters 15g may be obtained by the self-healing node 10e. The self-healing node 10e may then apply the merged training parameters 15g to its local model and then update its state, which is written to the distributed ledger 42. As a result of the update, the local ML state 17 should be able to recover to a point that is consistent with the global ML state 18. It should be appreciated that although parameter sharing is discussed as an example of a corrective action in reference to FIG. 2A, the self-healing techniques can perform different forms of corrective actions, as deemed appropriate, which allow the self-healing node 10e to update its local state and achieve synchronization with the blockchain network 200. Details regarding the corrective actions that can be implemented by the self-healing aspects of the embodiments are discussed in reference to FIG. 5.

In some cases, the master node 10g indicating that it has completed the merge, also releases its status as master node for the iteration. In the next iteration a new master node will likely, though not necessarily, be selected. Training may iterate until the training parameters converge. Training iterations may be restarted once the training parameters no longer converge, thereby continuously improving the model as needed through the blockchain network.

Referring now to FIG. 2B, the second phase of the communication is shown. The second phase can generally be described as communication within the blockchain network 200 after the self-healing node 10e has been synchronized. FIG. 2B illustrates that the second phase can involve ensuring that the local ML state 18 has consistency with the global ML state 17. In some cases, this determination can include performing another comparison between the global ML state 17 and the local ML state 18 after corrective actions have been completed. The consistency signifies that the self-healing node 10e is now at a state that consistent with the other nodes on the blockchain network 200. Restated, the data at the self-healing node 10e is now up-to-date and based on the most recent iteration of model building conducted by the system and maintained by the distributed ledger 42. Recovering the local state of the self-healing node 10e can indicate a successful completion of synchronization of node 10e with the blockchain network 200. After the self-healing node 10e is synchronized, the node 10e can mark itself an being in-sync ("I-S") in the distributed ledger 42. FIG. 2B shows that self-healing node 10e can generate a blockchain transaction 20 indicating that it is in-synch. By transmitting this "I-S" blockchain transaction 20, the self-healing node 10e signals to the network 200 that it corrected for any potential impacts of the fault, and can be reintroduced into the model building process. According to the embodiments, the "I-S" blockchain transaction 20 indicates to the master node 10g that the self-healing node 10e is now ready to share its learning as a participant node during successive iterations of model building.

Because decentralized machine learning as described herein occurs over a plurality of iterations and different sets of nodes may enroll to participate in any one or more iterations, decentralized model building activity can be dynamically scaled as the availability of nodes changes. For instance, even as autonomous vehicle computers go online (such as being in operation) or offline (such as having vehicle engine ignitions turned off), the system may continuously execute iterations of machine learning at available nodes. Using a distributed ledger, as vehicles come online, they may receive an updated version of the distributed ledger, such as from peer vehicles, and obtain the latest parameters that were learned when the vehicle was offline.

Furthermore, dynamic scaling does not cause degradation of model accuracy. By using a distributed ledger to coordinate activity and smart contracts to enforce synchronization by not permitting stale or otherwise uninitialized nodes from participating in an iteration, the stale gradients problem can be avoided. Use of the decentralized ledger and smart contracts (shown in FIG. 1) may also make the system fault-tolerant. Node restarts and other downtimes can be handled seamlessly without loss of model accuracy by dynamically scaling participant nodes and synchronizing learned parameters. Moreover, building applications that implement the ML models for experimentation can be simplified because a decentralized application can be agnostic to network topology and role of a node in the system.

Figure 3:
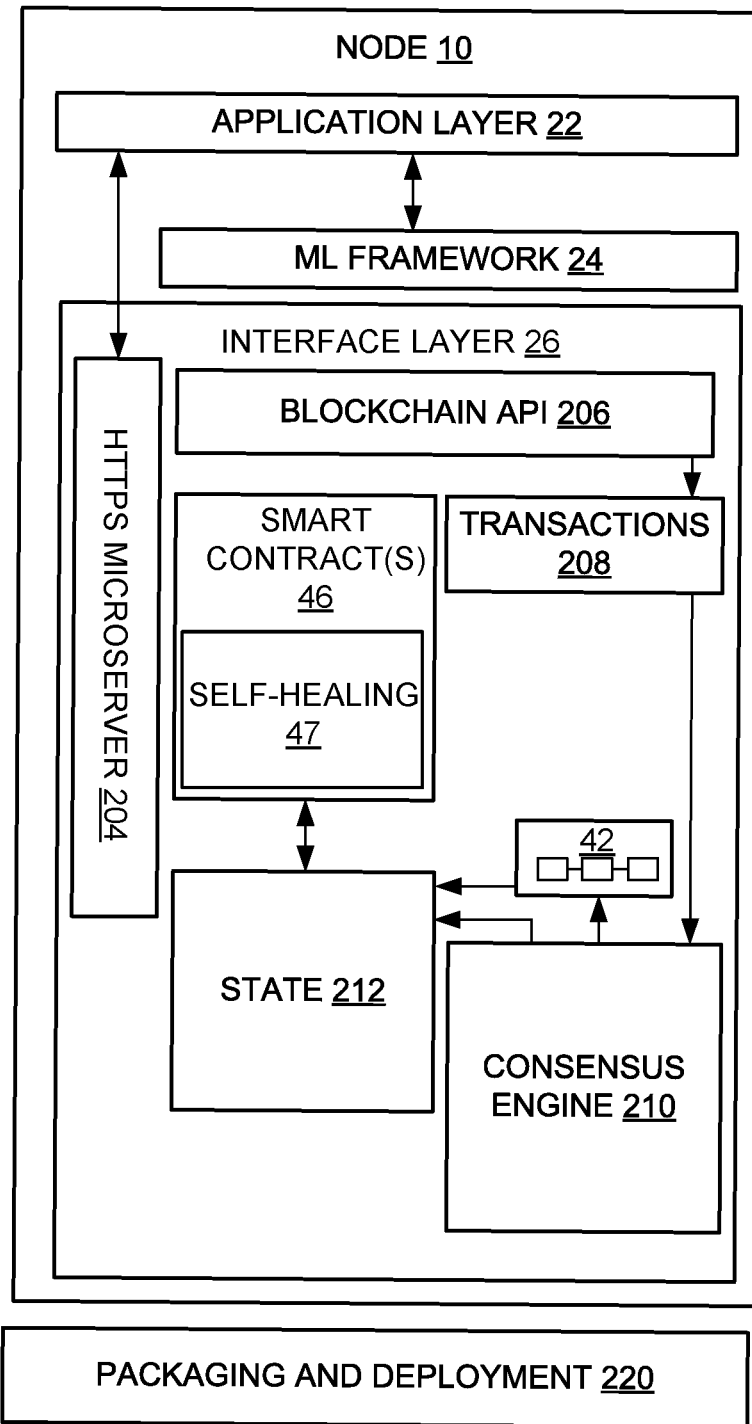
FIG. 3 illustrates an example of a node configured for performing the self-healing techniques shown in FIGS. 2A-2B, according to some embodiments.

Referring now to FIG. 3, a schematic diagram of a node 10 that is configured for participating in an iteration of machine learning using blockchain is illustrated. FIG. 3 shows an example configuration of the node 10 which includes a self-healing mode 47 for implementing the self-healing aspects disclosed herein. In the illustrated example, the self-healing module 47 can be a modular portion of the rules realized by smart contracts 46. As described above, smart contracts 46 may include rules that configure the node 10 to behave in certain ways in relation to decentralized machine learning. In particular, rules encoded by the self-healing model 47 can program node 10 to perform self-healing in a manner that reintroduces the node 10e into the decentralized model building process, as previously described. For example, the smart contacts 46 can cause node 10 to use the application layer 22 and the distributed ledger 42 to coordinate parallel model building during an iteration with other participant nodes. The application layer 22 may include a blockchain agent that initiates model training. Even further, the smart contracts 46 can configure the node 10 to communicate the shared parameters (as opposed to raw data).

The interface layer 26 may include a messaging interface used for the node 10 to communicate via a network with other participant nodes. As an example, the interface layer 26 provides the interface that allows node 10 to communicate its shared parameters (shown in FIG. 2B) to the other participating nodes during ML. The messaging interface may be configured as a Secure Hypertext Transmission Protocol ("HTTPS") microserver 204. Other types of messaging interfaces may be used as well. The interface layer 26 may use a blockchain API 206 to make API calls for blockchain functions based on a blockchain specification. Examples of blockchain functions include, but are not limited to, reading and writing blockchain transactions 208 and reading and writing blockchain blocks to the distributed ledger 42. One example of a blockchain specification is the Ethereum specification. Other blockchain specifications may be used as well. According to some embodiments, after a fault, the self-healing module 47 waits for the blockchain API 206 to be fully operational prior to initiating the self-healing techniques described herein. Thus, the self-healing module 47 safeguards against attempting to perform self-healing functions that that are dependent on the blockchain, such as auto-synchronization.

Consensus engine 210 may include functions that facilitate the writing of data to the distributed ledger 42. For example, in some instances when node 10 operates as a master node (e.g., one of the participant nodes 10), the node 10 may use the consensus engine 210 to decide when to merge the shared parameters from the respective nodes, write an indication that its state 212 has changed as a result of merging shared parameters to the distributed ledger 42, and/or to perform other actions. In some instances, as a participant node (whether a master node or not), node 10 may use the consensus engine 210 to perform consensus decisioning such as whether to enroll a node to participate in an iteration of machine learning. In this way, a consensus regarding certain decisions can be reached after data is written to distributed ledger 42.

In some implementations, packaging and deployment 220 may package and deploy a model 44 as a containerized object. For example, and without limitation, packaging and deployment 220 may use the Docker platform to generate Docker files that include the model 44. Other containerization platforms may be used as well. In this manner various applications at node 10 may access and use the model 44 in a platform-independent manner. As such, the models may not only be built based on collective parameters from nodes in a blockchain network, but also be packaged and deployed in diverse environments.

Figure 4:
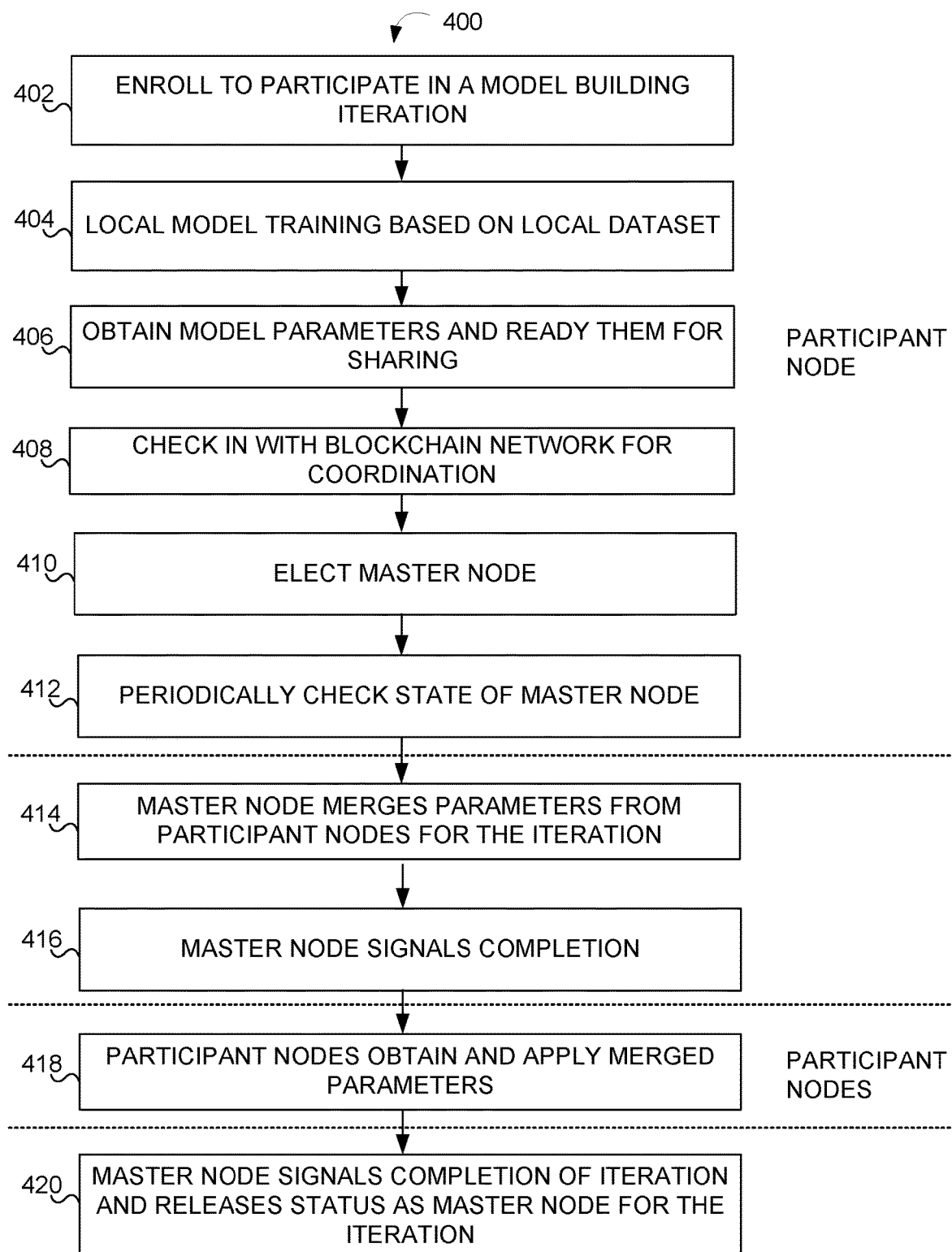
FIG. 4 is an operational flow diagram illustrating an example of a process of an iteration of model building for ML using blockchain, according to some embodiments.

Further details of an iteration of model-building are now described with reference to FIG. 4, which illustrates an example of a process 400 of an iteration of model building using blockchain according to one embodiment of the systems and methods described herein. As illustrated in FIG. 4, operations 402-412 and 418 are applicable to participant nodes, whereas operations 414, 416, and 420 are applicable to master node.

In an operation 402, each participant node may enroll to participate in an iteration of model building. In an implementation, the smart contracts (shown in FIG. 3) may encode rules for enrolling a node for participation in an iteration of model building. The rules may specify required credentials, valid state information, and/or other enrollment prerequisites. The required credentials may impose permissions on which nodes are allowed to participate in an iteration of model building. In these examples, the blockchain network may be configured as a private blockchain where only authorized nodes are permitted to participate in an iteration.

The authorization information and expected credentials may be encoded within the smart contracts or other stored information available to nodes on the blockchain network. The valid state information may prohibit nodes exhibiting certain restricted semantic states from participating in an iteration. The restricted semantic states may include, for example, having uninitialized parameter values, being a new node requesting enrollment in an iteration after the iteration has started (with other participant nodes in the blockchain network), a stale node or restarting node, and/or other states that would taint or otherwise disrupt an iteration of model building. Stale or restarting nodes may be placed on hold for an iteration so that they can synchronize their local parameters to the latest values, such as after the iteration has completed.

Once a participant node has been enrolled, the blockchain network may record an identity of the participant node so that an identification of all participant nodes for an iteration is known. Such recordation may be made via an entry in the distributed ledger. The identity of the participant nodes may be used by the consensus engine (shown in FIG. 3) when making strategic decisions.

The foregoing enrollment features may make model building activity fault tolerant because the topology of the model building network (i.e., the blockchain network) is decided at the iteration level. This permits deployment in real world environments like autonomous vehicles where the shape and size of the network can vary dynamically.

In an operation 404, each of the participant nodes may execute local model training on its local training dataset. For example, the application layer (shown in FIG. 3) may interface with the machine learning framework (shown in FIG. 3) to locally train a model on its local training dataset. In some cases, operation 404 can involve a biased data environment as a result of privacy restrictions. Accordingly, during operation 404, the full data set used for locally training a model at a node may include some private data, thus causing the full data set to be not be accessible at other participant nodes without compromising its privacy. Model building process 400 employs parameter sharing techniques which enable privacy of data to be preserved during the collaborative model-building process 400. Additionally, parameter sharing allows a node's local model to be updated using the learning performed by other participant nodes in the blockchain network. Thus, the parameter sharing techniques can be advantageous in fault scenarios, where a node may be down and unable to participate in a few iterations of model building. For example, in the realm of self-healing, a node that is recovering from a fault may use shared training parameters from its peers (or merged training parameters from the master node) to update its local model, as opposed to applying its local data that may be potentially stale. As discussed in greater detail in reference to FIG. 5, parameter sharing can be employed as a corrective action used to re-synchronize a self-healing node with the blockchain network.

In an operation 406, each of the participant nodes may generate local parameters based on the local training and may keep them ready for sharing with the blockchain network to implement parameter sharing. For example, after the local training cycle is complete, the local parameters may be serialized into compact packages that can be shared with rest of the blockchain network, in a manner similar to the shared parameters illustrated in FIG. 2A. Such sharing may be facilitated through making the shared parameters available for download and/or actively uploading them through peer-to-peer or other data transmission protocols. In some embodiments, the smart contracts may encode rules for a node to communicate, or otherwise share, its shared parameters.

In an operation 408, each participant node may check in with the blockchain network for co-ordination. For instance, each participant node may signal the other participant nodes in the blockchain network that it is ready for sharing its shared parameters. In particular, each participant node may write a blockchain transaction using, for example, the blockchain API (shown in FIG. 3) and broadcast the blockchain transaction via the messaging interface and the blockchain API. Such blockchain transactions may indicate the participant node's state (e.g., that it is ready to share its local parameters), a mechanism for obtaining the shared parameters, a location at which to obtain the shared parameters, and/or other information that conveys the readiness of a node for sharing or identification of how to obtain the shared parameters from other participant nodes. The transactions may be queued in a transaction queue or pool from which transactions are selected. These transactions may be timestamped and selected from, in some examples, in a first-in-first-out ("FIFO") manner.

In an operation 410, participant nodes may collectively elect a master node for the iteration. For example, the smart contracts may encode rules for electing the master node. Such rules may dictate how a participant node should vote on electing a master node (for implementations in which nodes vote to elect a master node). These rules may specify that a certain number and/or percentage of participant nodes should be ready to share its shared parameters before a master node should be elected, thereby initiating the sharing phase of the iteration. It should be noted, however, that election of a master node may occur before participant nodes 10 are ready to share their shared parameters. For example, a first node to enroll in an iteration may be selected as the master node. As such, election (or selection) of a master node per se may not trigger transition to the sharing phase. Rather, the rules of smart contracts may specify when the sharing phase, referred to as phase 1 in reference to FIG. 2A, should be initiated, thereby ensuring this transition occurs in a deterministic manner.

The master node may be elected in various ways other than or in addition to the first node to enroll. For example, a particular node may be predefined as being a master node. When an iteration is initiated, the particular node may become the master node. In some of these instances, one or more backup nodes may be predefined to serve as a master node in case the particular node is unavailable for a given iteration. In other examples, a node may declare that it should not be the master node. This may be advantageous in heterogeneous computational environments in which nodes have different computational capabilities. One example is in a drone network in which a drone may declare it should be not the master node and a command center may be declared as the master node. In yet other examples, a voting mechanism may be used to elect the master node. Such voting may be governed by rules encoded in a smart contract. This may be advantageous in homogeneous computational environments in which nodes have similar computational capabilities such as in a network of autonomous vehicles. Other ways to elect a master node may be used according to particular needs and based on the disclosure herein.

In an operation 412, participant nodes that are not a master node may periodically check the state of the master node to monitor whether the master node has completed generation of the merged parameters based on the shared parameters that have been locally generated by the participant nodes. For example, each participant node may inspect its local copy of the distributed ledger, within which the master node will record its state for the iteration on one or more blocks.

In an operation 414, the master node may enter a sharing phase in which some or all participant nodes are ready to share their shared parameters. For instance, the master node may obtain shared parameters from participant nodes whose state indicated that they are ready for sharing. Using the blockchain API, the master node may identify transactions that both: (1) indicate that a participant node is ready to share its shared parameters and (2) are not signaled in the distributed ledger. In some instances, transactions in the transaction queue have not yet been written to the distributed ledger. Once written to the ledger, the master node (through the blockchain API) may remove the transaction from or otherwise mark the transaction as confirmed in the transaction queue. The master node may identify corresponding participant nodes that submitted them and obtain the shared parameters (the location of which may be encoded in the transaction). The master node may combine the shared parameters from the participant nodes to generate merged parameters (shown in FIG. 2B) for the iteration based on the combined shared parameters. It should be noted that the master node may have itself generated local parameters from its local training dataset, in which case it may combine its local parameters with the obtained shared parameters as well. Consequently, the master node can combine all of the individual learning from each of the participant nodes across the blockchain network during the distributed process. For example, operation 414 can be described as compiling the learned patterns from training local model at each of the participant node using by merging the shared parameters. As alluded to above, at operation 414, the master node can use shared parameters from training the models, rather than the raw data used to build the models to aggregate the distributed learning. In an implementation, the master node may write the transactions as a block on the distributed ledger, for example using blockchain API.

In an operation 416, the master node may signal completion of the combination. For instance, the master node may transmit a blockchain transaction indicating its state (that it combined the local parameters into the final parameters). The blockchain transaction may also indicate where and/or how to obtain the merged parameters for the iteration. In some instances, the blockchain transaction may be written to the distributed ledger.

In an operation 418, each participant node may obtain and apply the merged parameters on their local models. For example, a participant node may inspect its local copy of the distributed ledger to determine that the state of the master node indicates that the merged parameters are available. The participant node may then obtain the merged parameters. It should be appreciated that the participant nodes are capable of obtaining, and subsequently applying, the combined learning associated with the merged parameters (resulting from local models) such that it precludes the need to transmit and/or receive full training datasets (corresponding to each of the local model). Furthermore, any private data that is local to a participant node and may be part of its full training dataset can remain protected.

In an operation 420, the master node may signal completion of an iteration and may relinquish control as master node for the iteration. Such indication may be encoded in the distributed ledger for other participant nodes to detect and transition into the next state (which may be either applying the model to its particular implementation and/or readying for another iteration.

By recording states on the distributed ledger and related functions, the blockchain network may effectively manage node restarts and dynamic scaling as the number of participant nodes available for participation constantly changes, such as when nodes go on-and-offline, whether because they are turned on/turned off, become connected/disconnected from a network connection, and/or other reasons that node availability can change.

Figure 5:
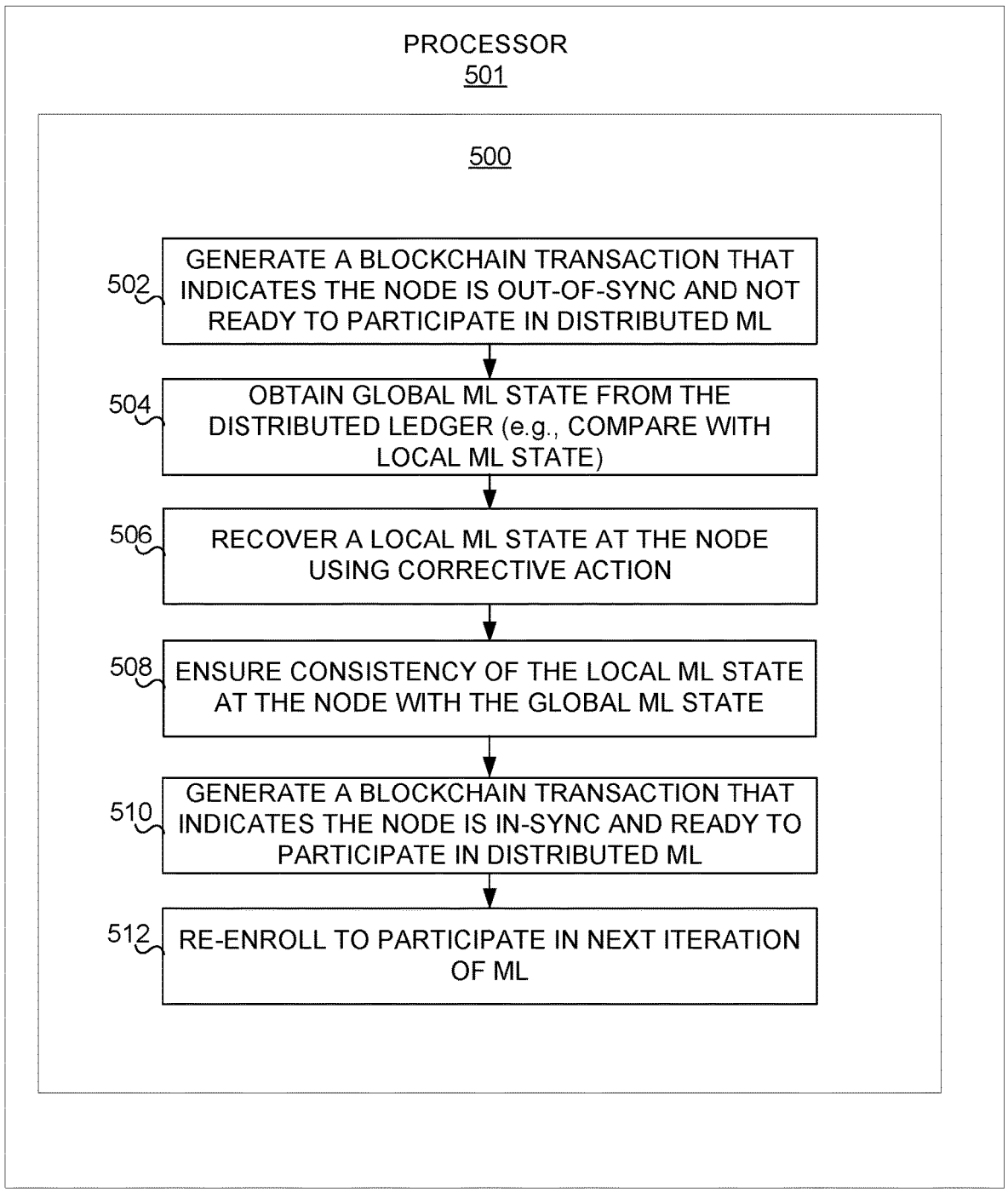
FIG. 5 is an operational flow diagram illustrating an example of a process for self-healing that may be performed by a node shown in FIGS. 2A-2B, according to some embodiments.

FIG. 5 illustrates an example of a process 500 at a node that can perform self-healing, in a manner that provides fault tolerance during decentralized machine learning. In some cases, the process 500 may occur after, at least, a first iteration of model building, as previously described in reference to FIG. 4. Process 500 is illustrated as a series of executable operations performed by processor 501, which can be the processor of a node (shown in FIG. 1) that may have undergone an intermittent fault, such as a connectivity outage. The node can perform self-healing to reintegrate itself back into the decentralized model building process described herein. Processor 501 executes the operations of process 500, thereby implementing the disclosed self-healing techniques. The process 500 can be executed automatically by a node, after it has recovered from the fault condition. For example, referring to the connectivity outage example in FIG. 1, self-healing process 500 can begin once the node has determined that wireless connectivity has been regained.

In an operation 502, the node can generate a blockchain transaction indicating that it is "out-of-sync". The "out-of-sync" blockchain transaction can be recorded in the distributed ledger, as an indication to other nodes in the blockchain network that the self-healing node is not yet ready to contribute to the model building iteration and/or act as a participant node. In some instances, the "out-of-sync" blockchain transaction is implemented by smart contracts (shown in FIG. 3). In some cases, the "out-of-sync" blockchain transaction of operation 502 can be obtained by the master node, serving as an indication that the self-healing node may not have a model that is synchronized with the most recent iteration of ML. Thus, in response to the "out-of-sync" blockchain transaction at operation 502, the master node can exclude the self-healing node from participating in a subsequent iteration of training the ML model. The exclusion master node, which causes the self-healing node to effectively "wait" (e.g., for a complete iteration or epoch), prevents any training parameters at the self-healing node from being applied to the model building for an iteration.

In some cases, the self-healing node may perform one or more preliminary action prior to operation 502. For instance, the self-healing node can ensure that all services that are exposed as part of an initial set-up procedure are properly running. If the services fail to run properly, the self-healing node made automatically perform another restart. Additionally, the self-healing node may ensure that all security attributes correct and are aligned with the data exposed in the initial set-up procedure.

In an operation 504, the self-healing node can obtain a global ML state from the distributed ledger. Obtaining the global ML state can be executed as part of the synchronization aspects of self-healing, which determines whether the current local ML state is stale with respect to the rest of the participant nodes in the blockchain network. The outage may cause the self-healing node to have stale, or out-of-date learning data (e.g., training parameters) which can degrade the global state of the system if introduced into the model building process. The self-healing node being aware of the global ML state, allows the node to subsequently auto-synchronize its current state with the current state of the system. In some embodiments, the self-healing node also obtains its local ML state from the distributed ledger. It is characteristic of blockchain for the distributed ledger to maintain state data for all of the nodes on the blockchain network. Consequently, a data structure maintaining the local ML state of the self-healing node will at the latest checkpoint, will also be in the distributed ledger. When necessary, for example if a self-healing node loses all of its localized ML data, the local ML state can also be obtained from the distributed ledger in operation 504.

Also, operation 504 can include comparing the obtained global ML state with the local ML state, in order to determine whether the local ML state is consistent with the global state. In instances when the comparison indicates that there is consistency between the local ML state and the global ML state, the self-healing node can continue with normal operations. This can be the result of the self-healing node restarting quickly enough that updates to the ML data were not lost during the outage. Accordingly, in this scenario, the self-healing node maintained its synchronization with the system, even in the presence of the fault.

In an operation 506, the self-healing node recovers the local ML state at the node using one or more corrective actions. The comparison at operation 504 can determine that the local ML state is inconsistent with the global ML state. Accordingly, the self-healing node can be aware that its current ML state is stale, or out-of-date, with respect to the most recent iteration of model building performed by another participant node on the blockchain network. As a result, the self-healing node can automatically perform corrective actions to recover its local ML state to the point of the global ML state. Operation 506 can include executing multiple corrective actions, such as gradient sharing, parameter sharing, and the like. It should be understood that any method, process, or algorithm that allows the local ML state to be recovered using the state of peer nodes in the blockchain network to achieve consistency with the global ML state can be used. In the case of gradient sharing, the self-healing node can acquire the latest ML checkpoint from at least one healthy peer and apply it to update is local model. Parameter sharing can be performed in operation 506 in the manner described above in reference to FIG. 4.

In an operation 508, subsequent to the corrective actions of operation 506, the self-healing node can ensure consistency of the local ML state with the global ML state. In some cases, operation 508 can involve performing another comparison of the local ML state, now updated by the corrective actions, with the global ML state.

In an operation 510, the node can generate a blockchain transaction indicating that it is "in-sync". The "in-sync" blockchain transaction can be recorded in the distributed ledger, and indicate to other nodes in the blockchain network, including the master node, that the self-healing node is synchronized with the other node in the blockchain network, and is ready to contribute to the model building iteration and/or act as a participant node. Accordingly, the self-healing node has successfully completed auto-synchronization and should be at a state that is consistent with the rest of the system. The nodes can use the "in-sync" blockchain transaction to recognize that the self-healing node has reintegrated into the system and can participate in the decentralized model building process.

In operation 512, the self-healing node can re-enroll to be able to participate in a next iteration of model building. In some embodiments, the self-healing node is required to wait at least one full iteration, or epoch, before acting as a participant node in model building. Enrolling at operation 512 can be performed in a manner similar to enrolling as described above, and is not discussed in detail for purposes of brevity.

Figure 6:
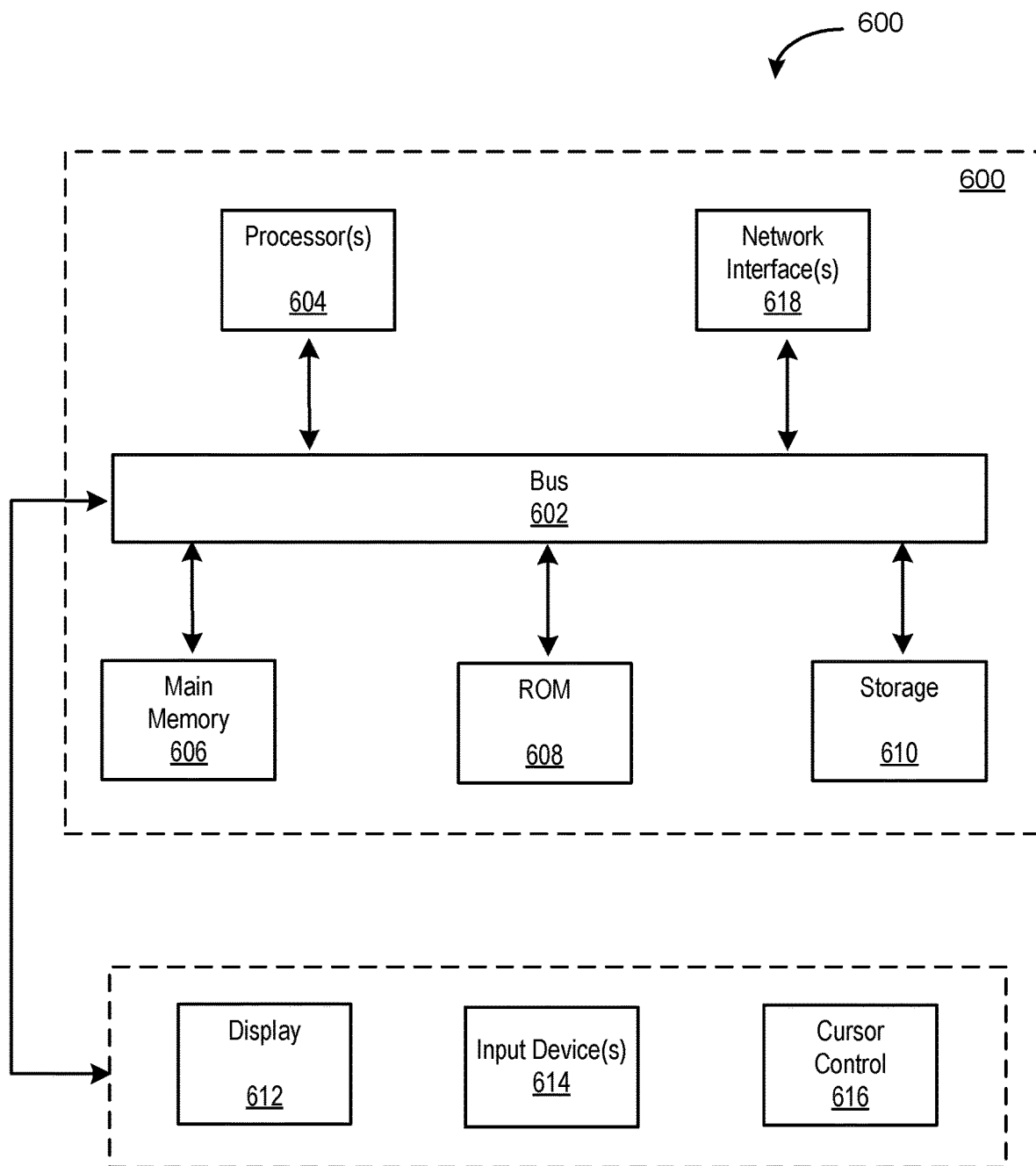
FIG. 6 illustrates an example computer system that may be used in implementing self-healing in decentralized model building for ML using blockchain relating to the embodiments of the disclosed technology.

FIG. 6 depicts a block diagram of an example computer system 600 in which self-healing embodiments described herein may be implemented. Furthermore, it should be appreciated that although the various instructions are illustrated as being co-located within a single processing unit, such as the node (shown in FIG. 1), in implementations in which processor(s) includes multiple processing units, one or more instructions may be executed remotely from the other instructions.

The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

The computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

The computer system 600 may be coupled via bus 602 to a display 612, such as a liquid crystal display (LCD) (or touch screen), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. In some embodiments, the same direction information and command selections as cursor control may be implemented via receiving touches on a touch screen without a cursor.

The computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to non-transitory media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

The computer system 600 also includes a communication interface 618 coupled to bus 602. Network interface 618 provides a two-way data communication coupling to one or more network links that are connected to one or more local networks. For example, communication interface 618 may be an integrated services digital network (ISDN) card, cable modem, satellite modem, or a modem to provide a data communication connection to a corresponding type of telephone line. As another example, network interface 618 may be a local area network (LAN) card to provide a data communication connection to a compatible LAN (or WAN component to communicated with a WAN). Wireless links may also be implemented. In any such implementation, network interface 618 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 618, which carry the digital data to and from computer system 600, are example forms of transmission media.

The computer system 600 can send messages and receive data, including program code, through the network(s), network link and communication interface 618. In the Internet example, a server might transmit a requested code for an application program through the Internet, the ISP, the local network and the communication interface 618.

The received code may be executed by processor 604 as it is received, and/or stored in storage device 610, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 600.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A system of decentralized machine learning (ML) comprising:

a self-healing computer node of a blockchain network comprising a plurality of computer nodes, the self-healing computer node when recovering from a fault condition within the blockchain network being programmed to:

determine, by the self-healing computer node, that the self-healing computer node is unable to share training parameters in a first iteration of training a machine-learning model;

based on the determination, generate a first blockchain transaction comprising an indication that the self-healing computer node is out-of-sync with the first iteration of training the machine-learned model, wherein the first blockchain transaction is to be added to a distributed ledger and informs the plurality of computer nodes that the self-healing computer node is not ready to participate in a second iteration of training the machine-learned model;

obtain a global ML state from the distributed ledger;

compare the obtained global ML state with a local ML state at the self-healing computer node to determine whether the local ML state is consistent with the global ML state;

based on the comparing, determine that the global ML state is not consistent with the local ML state;

in response to the determining recover the local ML state using a trigger of a corrective action;

determine, by the self-healing computer node, that the self-healing computer node is able to share the training parameters in the second iteration of training the machine-learning model;

based on the determination, generate a second blockchain transaction comprising an indication that the self-healing computer node is in-sync with the second iteration of training the machine-learned model, wherein the second blockchain transaction is to be added to the distributed ledger and informs the plurality of computer nodes that the self-healing computer node is ready to participate in the second iteration of training the machine-learned model; and re-enroll the self-healing computer node with the blockchain network to participate in the second iteration of training the machine-learned model.

2. The system of claim 1, further comprising:
participant nodes from the plurality of computer nodes in the blockchain network, wherein the participant nodes were enrolled to participate in the second iteration of training the machine-learned model; and
a master node selected from among the participant nodes in the second iteration of training the machine-learned model.

3. The system of claim 2, wherein the master node is programmed to:
receive the indication that the self-healing computer node is out-of-sync with the first iteration of training the machine-learned model; and
exclude the self-healing computer node from participating in the second iteration of training the machine-learned model based on the indication that the self-healing computer node is out-of-sync such that training parameters associated with the local ML state of the self-healing computer node are prevented from being applied to the machine-learned model.

4. The system of claim 3, wherein the excluding of the self-healing computer node from participating in the second iteration of training the machine-learned model enables the training of the machine-learned model to tolerate the fault condition within the blockchain network.

5. The system of claim 2, wherein the master node is programmed to:
receive the indication that the self-healing computer node is in-sync with the second iteration of training the machine-learned model; and
include the self-healing computer node in participating in the second iteration of training the machine-learned model based on the indication that the self-healing computer node is in-sync such that training parameters associated with the local ML state of the self-healing computer node are applied to the machine-learned model.

6. The system of claim 5, wherein the including of the self-healing computer node in participating in the second iteration of training the machine-learned model reintegrates the self-healing computer node in the decentralized machine learning.

7. The system of claim 2, wherein the self-healing computer node is further programmed to:
based on the triggering of the corrective action, obtain shared training parameters generated by a participant node in the blockchain network, wherein the shared training parameters are based on a local model of the participant node being trained during the second iteration of training the machine-learned model; and
apply the shared training parameters to update the local ML state at the self-healing computer node.

8. The system of claim 2, wherein the master node is further programmed to:
obtain shared training parameters from the participant nodes in the blockchain network, wherein the shared training parameters are based on local models of the participant nodes being trained during the first iteration of training the machine-learned model;
generate merged training parameters based on the shared training parameters;
generate a further blockchain transaction that includes an indication that the master node has generated the merged training parameters; and
cause the further blockchain transaction to be written as a block in the distributed ledger.

9. The system of claim 8, wherein the self-healing computer node is further programmed to:
based on the triggering of the corrective action, obtain the merged training parameters from the master node; and
apply the merged training parameters to update the local ML state at the self-healing computer node.

10. The system of claim 1, wherein the fault condition within the blockchain network is any of a network connectivity outage, a power outage, or a computer node crash.

11. The system of claim 1, wherein the local ML state is based on state transitions of the self-healing computer node.

12. A method of a self-healing computer node of a blockchain network comprising a plurality of computer nodes, the self-healing computer node recovering from a fault condition within the blockchain network, the method comprising:
determining that the self-healing computer node is unable to share training parameters in a first iteration of training a machine-learning model;
based on the determination, automatically generating, by the self-healing computer node, a first blockchain transaction comprising an indication that the self-healing computer node is out-of-sync with the first iteration of training the machine-learned model, wherein the first blockchain transaction is to be added to a distributed ledger and informs the plurality of computer nodes that the self-healing computer node is not ready to participate in a second iteration of training the machine-learned model;
obtaining, by the self-healing computer node, a global ML state from the distributed ledger;
comparing, by the self-healing computer node, the obtained global ML state with a local ML state at the self-healing computer node to determine whether the local ML state is consistent with the global ML state;
based on the comparing, determine that the global ML state is not consistent with the local ML state;
in response to the determining recover the local ML state using a trigger of a corrective action;
determining that the self-healing computer node is able to share the training parameters in the second iteration of training the machine-learning model;
based on the determination, automatically generating, by the self-healing computer node, a second blockchain transaction comprising an indication that the self-healing computer node is in-sync with the second iteration of training the machine-learned model, wherein the second blockchain transaction is to be added to the distributed ledger and informs the plurality of computer nodes that the self-healing computer node is ready to participate in the second iteration of training the machine-learned model; and
re-enrolling, by the self-healing computer node, with the blockchain network to participate in the second iteration of training the machine-learned model.

13. The method of claim 12, comprising:
receiving, by a master node, the indication that the self-healing computer node is out-of-sync with the first iteration of training the machine-learned model; and
excluding, by the master node, the self-healing computer node from participating in the second iteration of training the machine-learned model based on the indication that the self-healing computer node is out-of-sync such that training parameters associated with the local ML state of the self-healing computer node are prevented from being applied to the machine-learned model.

14. The method of claim 13, wherein the excluding of the self-healing computer node from participating in the second iteration of training the machine-learned model enables the training of the machine-learned model to tolerate the fault condition within the blockchain network.

15. The method of claim 13, comprising:
receiving, by the master node, the indication that the self-healing computer node is in-sync with the second iteration of training the machine-learned model; and
including, by the master node, the self-healing computer node in participating in the second iteration of training the machine-learned model based on the indication that the self-healing computer node is in-sync such that training parameters associated with the local ML state of the self-healing computer node are applied to the machine-learned model.

16. The method of claim 15, wherein the including of the self-healing computer node in participating in the second iteration of training the machine-learned model reintegrates the self-healing computer node in the decentralized machine learning.

17. The method of claim 12, comprising:
based on the triggering of the corrective action, obtaining, by the self-healing computer node, shared training parameters generated by a participant node in the blockchain network, wherein the shared training parameters are based on a local model of the participant node being trained during the first iteration of training the machine-learned model; and
applying, by the self-healing computer node, the shared training parameters to update the local ML state at the self-healing computer node.

18. The method of claim 13, comprising:
based on the triggering of the corrective action, obtaining, at the self-healing computer node, merged training parameters generated by the master node, wherein the merged training parameters are based on merging multiple shared parameters from participant nodes in the blockchain network and generated during the second iteration; and
applying, by the self-healing computer node, the merged training parameters to update the local ML state at the self-healing computer node.

19. The method of claim 12, wherein the local ML state is based on state transitions of the self-healing computer node.

20. A non-transitory machine-readable storage medium comprising instructions executable by a self-healing computer node of a blockchain network comprising a plurality of computer nodes, wherein when the self-healing computer node is recovering from a fault condition within the blockchain network, the instructions upon execution cause the self-healing computer node to:
determine that the self-healing computer node is unable to share training parameters in a first iteration of training a machine-learning model;
based on the determination generate a first blockchain transaction comprising an indication that the self-healing computer node is out-of-sync with the first iteration of training the machine-learned model, wherein the first blockchain transaction is to be added to a distributed ledger and informs the plurality of computer nodes that the self-healing computer node is not ready to participate in a second iteration of training the machine-learned model;
obtain a global ML state from the distributed ledger;
compare the obtained global ML state with a local ML state at the self-healing computer node to determine whether the local ML state is consistent with the global ML state;
based on the comparing, determine that the global ML state is not consistent with the local ML state;
in response to the determining recover the local ML state using a trigger of a corrective action;
determine that the self-healing computer node is able to share the training parameters in the second iteration of training the machine-learning model;
based on the determination, generate a second blockchain transaction comprising an indication that the self-healing computer node is in-sync with the second iteration of training the machine-learned model, wherein the second blockchain transaction is to be added to the distributed ledger and informs the plurality of computer nodes that the self-healing computer node is ready to participate in the second iteration of training the machine-learned model; and
re-enroll the self-healing computer node with the blockchain network to participate in the second iteration of training the machine-learned model.

* * * * *